United States Patent
Komatsu

(10) Patent No.: US 8,674,245 B2
(45) Date of Patent: Mar. 18, 2014

(54) SWITCH DEVICE

(75) Inventor: Shinji Komatsu, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 213 days.

(21) Appl. No.: 13/347,372

(22) Filed: Jan. 10, 2012

(65) Prior Publication Data
US 2012/0175227 A1    Jul. 12, 2012

(30) Foreign Application Priority Data

Jan. 11, 2011    (JP) .................................. 2011-002698

(51) Int. Cl.
*H01H 9/00*    (2006.01)
(52) U.S. Cl.
USPC .............................. 200/18; 200/566; 200/571
(58) Field of Classification Search
USPC ......... 200/4, 5 R, 5 EA, 7, 18, 547–551, 564, 200/570, 571, 572
See application file for complete search history.

(56) References Cited

U.S. PATENT DOCUMENTS

2006/0243566 A1* 11/2006 Sakai ............................ 200/1 R

FOREIGN PATENT DOCUMENTS

JP    2008-284993    11/2008
WO    WO 2011001964 A1    1/2011

OTHER PUBLICATIONS

Extended European Search Report issued in corresponding European Patent Application No. 11195589.4, mailed Apr. 12, 2012.

* cited by examiner

*Primary Examiner* — Renee Luebke
*Assistant Examiner* — Harshad Patel
(74) *Attorney, Agent, or Firm* — Brinks Gilson & Lione

(57) ABSTRACT

A switch device includes a switch shifting a pair of input and output terminals in a housing and a manipulation knob for shifting the switch. The manipulation knob includes a rotating member rotatable to a plurality of rotating positions relative to the housing and a sliding member rotating with the rotating member and slidable along both positive and negative directions at each of the plurality of rotating positions, so that the manipulation knob is interconnected with a rotary shaft member which rotates with the rotating member. The switch gives an output corresponding to each direction according to the sliding of the sliding member in both the positive and negative directions even though the manipulation knob is at any one of the plurality of rotating positions. The rotary shaft member has a shifting unit for driving an external shifting mechanism accompanied by the rotating.

2 Claims, 6 Drawing Sheets

SWITCH DEVICE

CLAIM OF PRIORITY

This application claims benefit of Japanese Patent Application No. 2011-002698 filed on Jan. 11, 2011, which is hereby incorporated by reference in its entirety.

BACKGROUND

1. Field of the Disclosure

The present disclosure relates to a switch device which may be manipulated to rotate and slide as a seat switch of a vehicle or the like, and particularly to a switch device which may integrate electric outputs for manipulation in multiple directions and perform mechanical switching at the same time.

2. Description of the Related Art

A seat switch of a vehicle has a consolidated design so that a manipulation of sliding the seat in the forward and rearward direction, a manipulation of changing the reclining angle of the seat, and a manipulation of moving the seat surface in the vertical direction may be performed with a switch in a single location. Since the manipulations for a plurality of operations are performed, a switch device is provided in correspondence with each operation, and each switch device may have a manipulation knob which may be manipulated to slide. In this case, each operation may be performed by sliding any one of the manipulation knobs.

Meanwhile, an operation may be selected by turning the manipulation knob, without installing the manipulation knob for each operation, so that the selected operation may be performed by sliding the manipulation knob. In this case, manipulations for all operations may be consolidated in a single manipulation knob. Such a switch device is, for example, disclosed in Japanese Unexamined Patent Publication No. 2008-284993.

In a power seat, a motor is installed to operate the seat. A plurality of motors is installed in correspondence with each operation. For this reason, a switch device connects to an output system corresponding to each operation to operate each motor. It is also identical to the case where a plurality of operations is manipulated by a single manipulation knob.

However, in a power seat of the related art, it is required to prepare motors corresponding to every operation, which increases both weight and costs. In addition, more wires are required between the switch device and the motors, and assembly becomes complicated. Integrating the motors so that each operation may be performed by shifting a gear connected to the motor may be considered, but there is the potential for the structure to become rather complex since the switch device of the related art still requires a plurality of output systems and further requires shifting of the gear.

SUMMARY

A switch device includes a switch shifting a pair of terminals of an input terminal and an output terminal in a housing and a manipulation knob for shifting the switch. The manipulation knob includes a rotating member capable of performing rotating manipulation at a plurality of rotating positions with respect to the housing and a sliding member capable of performing slide manipulation in both the positive and negative directions at each of the plurality of rotating positions, so that the manipulation knob is interconnected with a rotary shaft member which rotates accompanied by the rotating manipulation. The switch gives an output corresponding to each direction according to the manipulation in both the positive and negative directions even though the manipulation knob is at any one of the plurality of rotating positions, and the rotary shaft member has a shifting unit for driving an external shifting mechanism accompanied by the rotating. In other features, a rotation driving unit capable of rotating with the rotating member and a horizontal driving unit capable of sliding with respect to the rotating driving unit together with the sliding member are installed at the housing. The switch includes a slide-interlocking switch installed at the rotation driving unit and shifted by the sliding of the horizontal driving unit, and a rotation-interlocking switch shifted by the rotation of the rotation driving unit. The rotation-interlocking switch connects the slide-interlocking switch to the input terminal and the output terminal at each of a plurality of rotating positions of the manipulation knob. The slide-interlocking switch shifts a connecting status between the input terminal and output terminal according to the manipulation in both the positive and negative directions.

DESCRIPTION OF THE EXEMPLARY EMBODIMENTS

Figure 1:
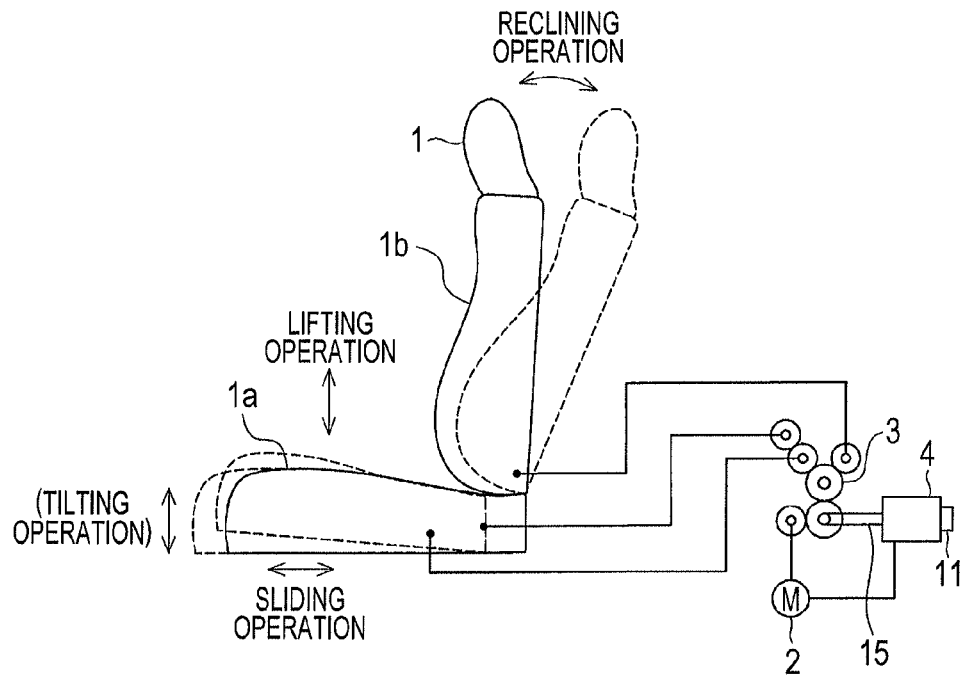
FIG. 1 is a schematic configuration view showing a power seat apparatus using a switch device.

An embodiment of the invention will be described in detail with reference to the drawings. FIG. 1 shows a schematic configuration view of a power seat apparatus using a switch device. As shown in FIG. 1, the power seat apparatus includes a vehicle seat 1 capable of operating in a plurality of directions, a single motor 2 for operating the seat 1, a shifting mechanism 3 for performing a plurality of operations by using the single motor 2, and a switch device 4 for shifting the shifting mechanism 3 and instructing turning on/off and rotation direction of the motor 2.

The seat 1 has a seat surface 1a and a rear surface 1b. The seat surface 1a may slide in the forward and rearward direction (sliding operation) and move in the vertical direction (lifting operation). The rear surface 1b recline (reclining operation). These operations may be performed in both the positive (+) and negative (−) directions.

Driving shafts for performing the sliding operation, the lifting operation and the reclining operation are included in the seat 1, and the shifting mechanism 3 switches between any one of the driving shafts to connect to the motor 2. The shifting mechanism 3 has a clutch mechanism and shifts the connection of the driving shaft to the motor 2 by inputting a mechanical rotating operation.

The switch device 4 has a manipulation knob 11 exposing in the vehicle, and the manipulation knob 11 is configured to perform a rotation manipulation and a slide manipulation. The rotation manipulation of the manipulation knob 11 allows perfect shifting to three rotating positions corresponding to three operations of the seat 1. In addition, the switch device 4 has a rotary shaft portion 15 rotating in association with the rotation manipulation of the manipulation knob 11, and the shifting mechanism 3 mechanically rotates by the rotation manipulation of the manipulation knob 11. The slide manipulation of the manipulation knob 11 may be performed with respect to both positive (+) and negative (−) directions on a straight line of the manipulation knob 11, and the slide manipulation in both the positive (+) and negative (−) directions gives an electric output in the positive (+) or negative (−) direction to the motor 2.

Figure 2:
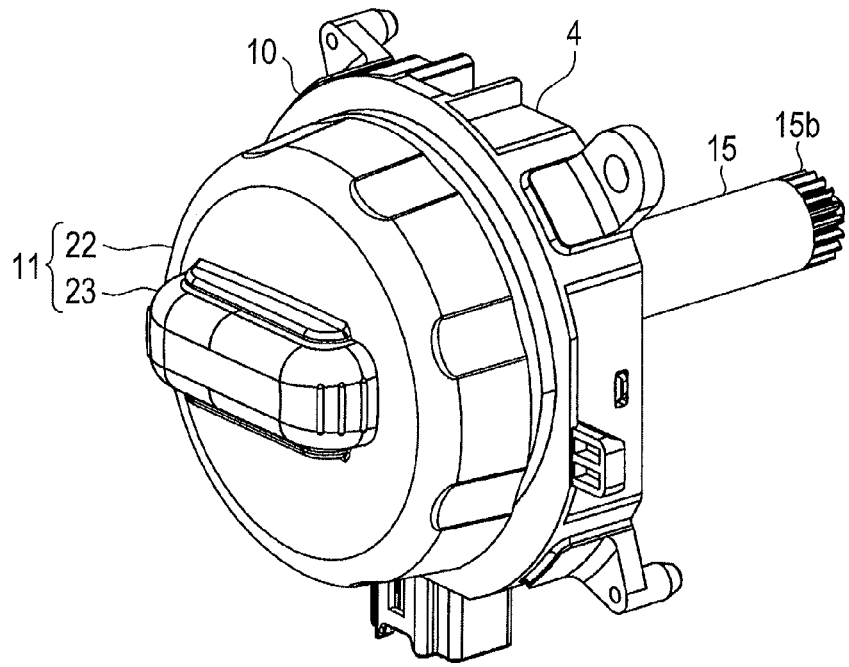
FIG. 2 is a perspective view showing a switch device according to a first embodiment.

FIG. 2 is a perspective view showing a switch device 4 according to a first embodiment. The switch device 4 includes a housing 10 serving as a base portion, and a manipulation knob 11 which may be manipulated to rotate to a plurality of rotating positions with respect to the housing 10 and may be manipulated to slide respectively at a plurality of rotating positions in both the positive (+) and negative (−) directions. The housing 10 is generally disposed at the side surface portion in the seat surface 1a of the seat 1. The plurality of rotating positions in the rotation manipulation are set to be three locations as described above, so that the electric output corresponding to the slide manipulation may be performed at each of the three rotating positions. Since just a single motor is operated, the electric output is performed with a single system.

The manipulation knob 11 is composed of two members including a rotating member 22 formed in a flat-cylindrical dial shape to rotate, and a sliding member 23 supported by the rotating member 22 and having a chip shape capable of sliding with respect to the rotating member 22. A person performing manipulation may rotate the rotating member 22 to any one rotating position to select any one to be performed from three kinds of operations of the seat 1, so that the operation of the seat 1 is performed by sliding the sliding member 23 in any one of the positive (+) and negative (−) directions.

A rotary shaft portion 15 protrudes on a side of the housing 10, which is opposite to the side where the manipulation knob 11 is installed. The rotary shaft portion 15 has a front end which is a shifting unit 15b formed in a gear shape, and the shifting unit 15b is interconnected with the above shifting mechanism 3. The rotary shaft portion 15 is interconnected with the manipulation knob 11, and rotates together by manipulating the rotating member 22 to rotate. Accompanied with this rotating operation, the shifting mechanism 3 is mechanically operated by the shifting unit 15b, so that the connection state between the motor 2 and the driving shaft in the seat 1 is shifted, thereby shifting the operation of the seat 1. Here, the shifting mechanism 3 performs shifting so that the sliding operation of the seat 1 is performed when the manipulation knob 11 is located at a first rotating position and the lifting operation of the seat 1 is performed when the manipulation knob 11 is located at a second rotating position, and the reclining operation of the seat 1 is performed when the manipulation knob 11 is located at a third rotating position.

Figure 3:
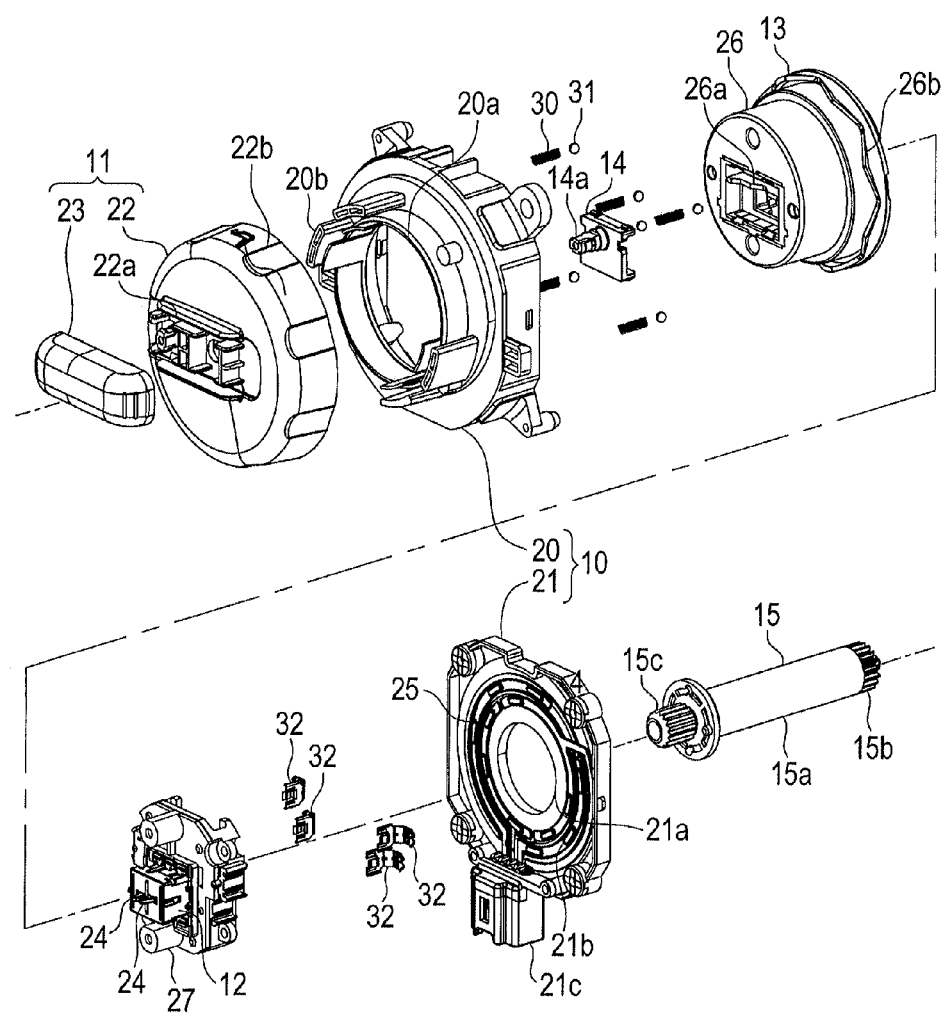
FIG. 3 is an exploded perspective view showing the switch device according to the first embodiment.

The configuration of the switch device 4 will be described in more detail. FIG. 3 is an exploded perspective view showing the switch device 4 according to the first embodiment. First, the housing 10 is composed of two members including an upper housing 20 supporting the manipulation knob 11, and a lower housing 21 configuring the rotary shaft portion 15. The upper housing 20 has an opening 20a in order to interconnect the manipulation knob 11 with the housing 10, and a manipulation knob supporting portion 20b rotatably supporting the rotating member 22 is formed around the opening 20a.

The lower housing 21 has an insert hole 21a formed at the center to insert the rotary shaft portion 15, fixed contact points 21b of the switch 12 are formed around the insert hole 21a in a contact point pattern along the circumferential direction. An input/output terminal portion 21c having an input terminal from a power source and an output terminal to the motor 2 is formed at the circumferential portion.

The manipulation knob 11 includes the rotating member 22 and the sliding member 23 as described above, and a guide portion 22a is formed at the rotating member 22 to allow the sliding member 23 to slide in both the positive (+) and negative (−) directions. In addition, a plurality of concave portions is formed in the side surface portion 22b of the rotating member 22 in the circumferential direction to ensure easy rotation manipulation. In addition, in FIG. 3, in the case where the sliding member 23 slides in the right direction, the manipulation is performed in the positive (+) direction, while, in the case where the sliding member 23 slides in the left direction, the manipulation is performed in the negative (−) direction.

A switch 12 operated to shift by the manipulation knob 11, a rotation driving unit 13 rotating by the rotation manipulation of the manipulation knob 11, and a horizontal driving unit 14 capable of sliding together with the sliding member 23 with respect to the rotation driving unit 13 may be received in the housing 10. Regarding the manipulation knob 11, since the sliding member 23 is engaged with a protrusion 14a formed on the horizontal driving unit 14 so that the horizontal driving unit 14 also slides by the slide manipulation of the sliding member 23 and that the sliding member 23 also rotates together by the rotation manipulation of the rotating member 22, the horizontal driving unit 14 rotates accordingly, and further the rotation driving unit 13 associated with the horizontal driving unit 14 also rotates.

The rotation driving unit 13 includes a holder member 26 having a cylindrical step, and a switch support member 27 which may be put into the holder member 26. The holder member 26 has a hollow at a side opposite to the side shown in FIG. 3 so that the switch support member 27 may be received therein, and has a horizontal guide portion 26a on the upper surface thereof so that the horizontal driving unit 14 may slide in both the positive (+) and negative (−) directions. In addition, an uneven portion 26b is formed on the outer circumferential surface along the circumferential direction.

The switch support member 27 has two slide-interlocking switches 24 and 24 at the upper surface thereof. If the horizontal driving unit 14 is operated by the sliding member 23 in the positive (+) direction, the right slide-interlocking switch 24 in the figure is operated at the lower surface side of the horizontal driving unit 14 to shift a contact point therein. Meanwhile, if the horizontal driving unit 14 is operated by the sliding member 23 in the negative (+) direction, the left slide-interlocking switch 24 in the figure is operated at the lower surface side of the horizontal driving unit 14 to shift a contact point therein. Since the switch support member 27 configures the rotation driving unit 13 and rotates simultaneously with the rotation manipulation of the manipulation knob 11, the switch support member 27 may be operated by the sliding member 23 even though the rotating member 22 is at any angle.

Four movable contact points 32 are installed at the lower surface side of the switch support member 27. The movable contact point 32 configures a rotation-interlocking switch 25 with a fixed contact point 21b installed at the lower housing 21 described above. The rotation-interlocking switch 25 is configured to shift the contact point status in accordance with the three rotation locations of the manipulation knob 11.

Biasing members 30 and attaching/detaching members 31 are installed at four locations in the circumferential direction between the holder member 26 and the upper housing 20 of the rotation driving unit 13. The biasing member 30 biases the attaching/detaching member 31 in a direction pressing the uneven portion 26b of the holder member 26 between the holder member 26 and the upper housing 20. If the rotation driving unit 13 rotates by the rotation manipulation of the manipulation knob 11, the attaching/detaching member 31 repeats attachment and detachment to/from the uneven portion 26b of the holder member 26, which may provide a clicking feeling by rotation manipulation.

The rotary shaft member 15 has a shaft portion 15a with an axial shape, a shifting unit 15b formed at one end portion of the shaft portion 15a, and a connection portion 15c connecting to the lower surface side of the switch support member 27 configuring the rotation driving unit 13. Since the connection portion 15c connects to the switch support member 27, the rotary shaft portion 15 rotates together with the rotation driving unit 13, namely is operated to rotate to accompany the rotation manipulation of the manipulation knob 11. As described above, by this rotating operation, the rotary shaft portion 15 performs a shifting operation to the shifting mechanism 3.

Figure 4:
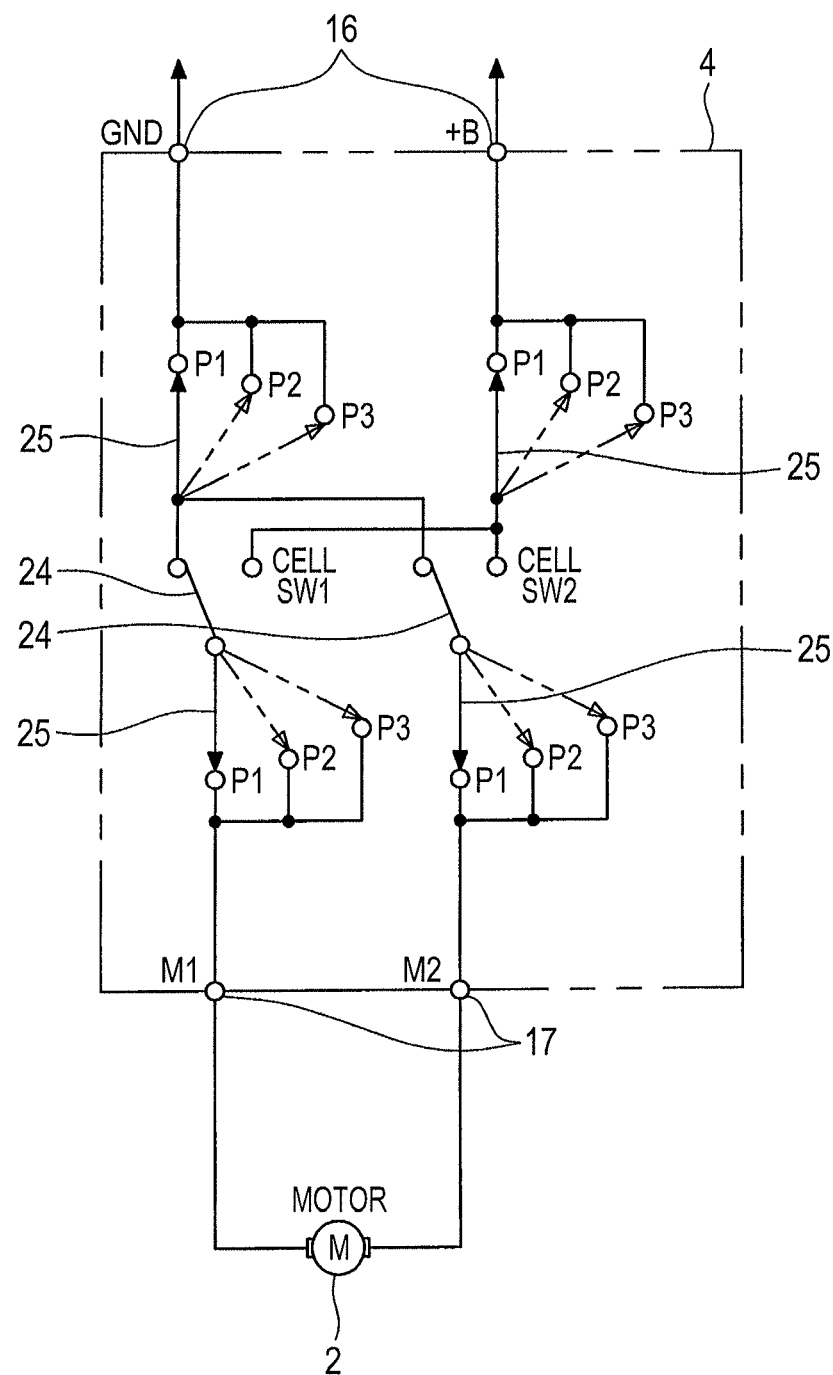
FIG. 4 is a circuit diagram showing the switch device according to the first embodiment.

The electric configuration of the switch device 4 will be described. FIG. 4 is a circuit diagram showing the switch device 4 according to the first embodiment. Since there is a single motor 2, an input terminal 16 and an output terminal 17 for the switch device 4 make a pair. The input terminal 16 has a ground terminal GND and a power terminal +B, and the output terminal 17 has a first terminal M1 and a second terminal M2. Here, in the case where electric current flows in the output terminal 17 from the first terminal M1 to the second terminal M2, the motor 2 rotates in the positive (+) direction, while, in the case where electric current flows in the output terminal 17 from the second terminal M2 to the first terminal M1, the motor 2 rotates in the negative (+) direction.

In the switch device 4, the slide-interlocking switch 24 and the rotation-interlocking switch 25 are disposed as described above. The slide-interlocking switches 24 are disposed at two locations (CELLSW1 and CELLSW2) in FIG. 4, and in a status where manipulation is not performed, the first terminal M1 and the second terminal M2 of the output terminal 17 respectively connect to the ground terminal GND of the input terminal 16.

The rotation-interlocking switch 25 shifts among a position P1, a position P2, and a position P3 corresponding to three rotating positions of the manipulation knob 11. FIG. 4 illustrates four rotation-interlocking switches 25, corresponding to four movable terminals 32 as shown in FIG. 3. The four rotation-interlocking switches 25 are shifted to the same position by the rotation manipulation of the manipulation knob 11.

The operation when the manipulation knob 11 performs manipulation is as follows. First, when the rotating position of the manipulation knob 11 is the first position, the rotation-interlocking switch 25 is at the position P1, and at this time, if the manipulation knob 11 performs slide manipulation to one side, the slide-interlocking switch 24 (CELLSW1) of one side is shifted so that the first terminal M1 connects to the power terminal +B. The second terminal M2 keeps connecting to the ground terminal GND. Therefore, electric current flows from the first terminal M1 through the motor 2 to the second terminal M2, and the motor 2 rotates in the positive (+) direction. If the manipulation knob 11 performs slide manipulation to another side, the slide-interlocking switch 24 (CELLSW2) of another side is shifted so that the second terminal M2 connects to the power terminal +B, and therefore the motor 2 rotates in the negative (+) direction. As described above, when the rotating position of the manipulation knob 11 is the first position, since the shifting mechanism 3 connects the motor 2 to a driving shaft for sliding operation by the rotary shaft portion 15, the seat 1 is operated to slide by the slide manipulation of the manipulation knob 11.

When the rotating position of the manipulation knob 11 is the second position, the rotation-interlocking switch 25 is at the position P2 and is operated at this time in the same way as when the rotation-interlocking switch 25 is at the position P1. In addition, when the rotating position of the manipulation knob 11 is the second position, since the shifting mechanism 3 connects the motor 2 to the driving shaft for lifting operation by the rotary shaft portion 15, the seat 1 is operated to lift by the slide manipulation of the manipulation knob 11.

When the rotating position of the manipulation knob 11 is the third position, the rotation-interlocking switch 25 is at the position P3. Since the position P3 connects to the output terminal opposite to the locations P1 and P2, if the slide-interlocking switch 24 (CELLSW1) of one side is shifted, electric current flows from the second terminal M2 through the motor 2 to the first terminal M1, and the motor 2 rotates in the negative (+) direction. If the slide-interlocking switch 24 (CELLSW2) of another side is shifted, electric current flows from the first terminal M1 through the motor 2 to the second terminal M2, and the motor 2 rotates in the positive (+) direction. In addition, when the rotating position of the manipulation knob 11 is the third position, since the shifting mechanism 3 connects the motor 2 to a driving shaft for the reclining operation by means of the rotary shaft portion 15, the seat 1 is operated to recline by the slide manipulation of the manipulation knob 11.

As described above, by installing the manipulation knob 11 capable of being manipulated to rotate and slide and the rotary shaft portion 15 rotating accompanied by the rotation manipulation to the switch device 4, the above output may be provided at a plurality of rotation locations of the manipulation knob 11 by the positive (+) and negative (−) slide manipulation. In addition, as the shifting mechanism 3 is mechanically shifted by the rotary shaft portion 15, in the case where a plurality of operations is performed using a single motor 2, the output to the motor 2 may be provided using a single system by mechanically shifting the operations, which allows the switch device 4 to have a simple configuration.

Figure 5:
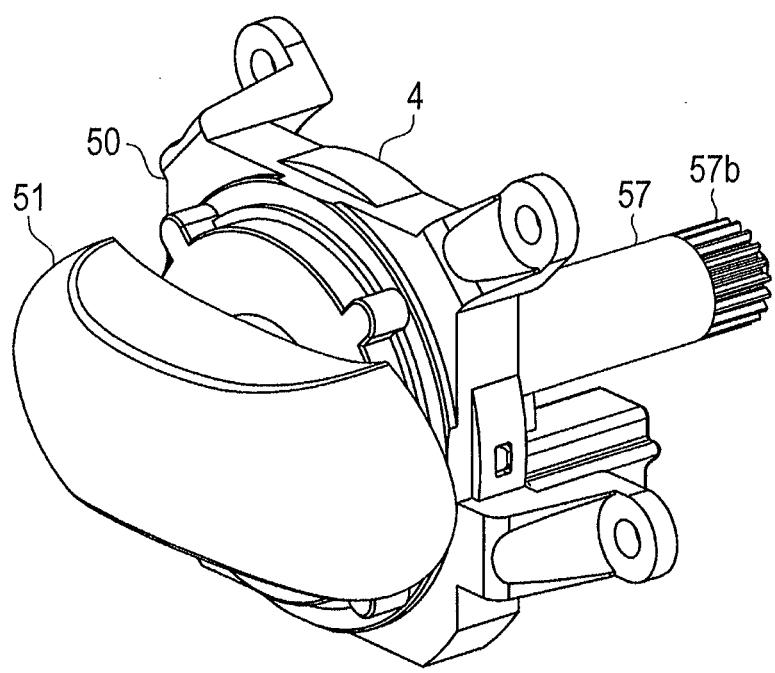
FIG. 5 is a perspective view showing a switch device according to a second embodiment.

Next, the second embodiment of the switch device 4 will be described. FIG. 5 is a perspective view showing a switch device 4 according to the second embodiment. The switch device 4 of the second embodiment also has the same basic configuration as the switch device 4 of the first embodiment. In other words, a manipulation knob 51 is installed to a housing 50 to be manipulated to rotate and slide, and a rotary shaft member 57 capable of rotating accompanied by the rotation manipulation of the manipulation knob 51 protrudes from the housing 50. A shifting unit 57b with a gear shape is formed at the front end portion of the rotary shaft member 57, and may perform the shifting operation of the shifting mechanism 3. Meanwhile, the switch device 4 of the second embodiment is configured so that the manipulation knob 51 composed of a single member may be manipulated to rotate and slide. For this reason, the inner configuration of the manipulation knob 51 and the housing 50 is different from that of the first embodiment.

Figure 6:
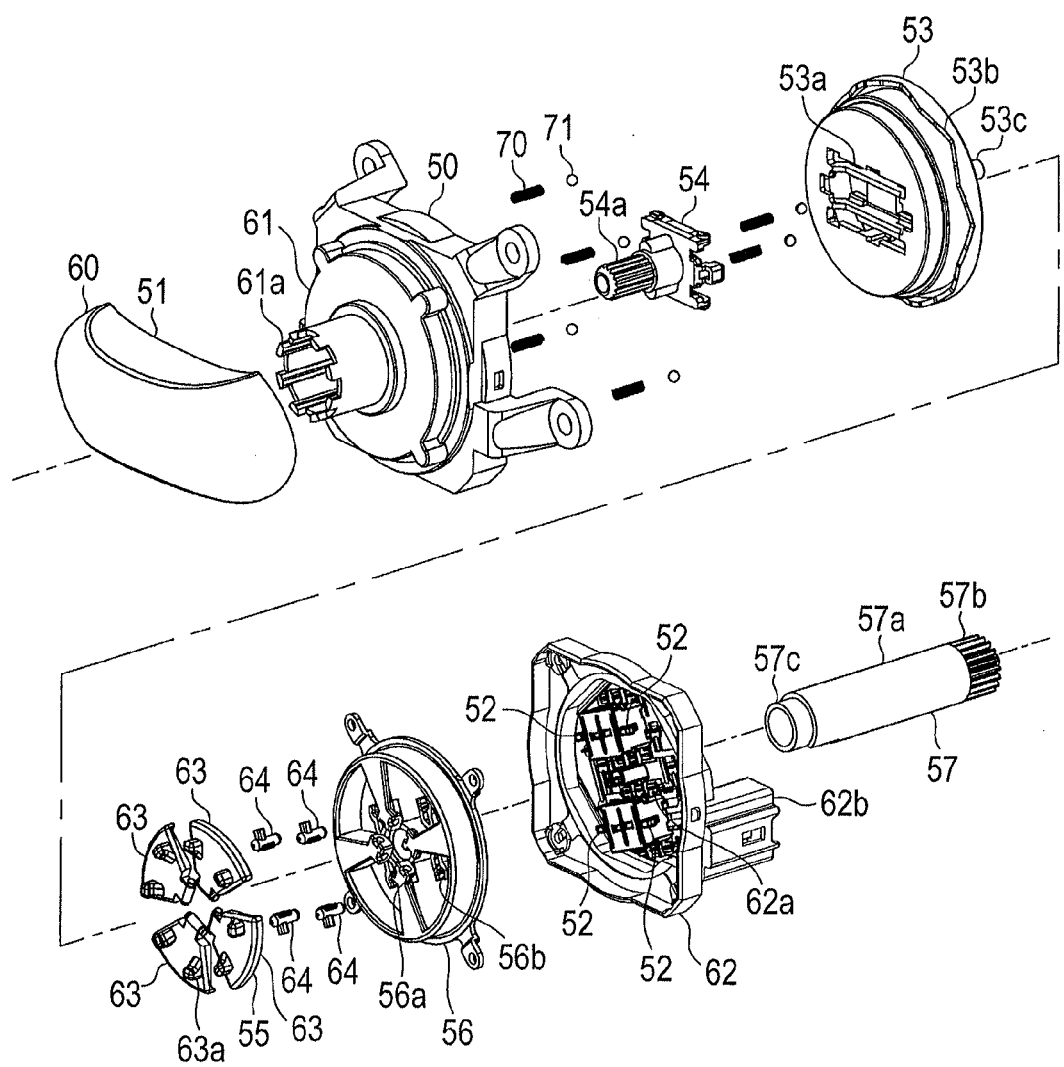
FIG. 6 is an exploded perspective view showing the switch device according to the second embodiment.

FIG. 6 is an exploded perspective view showing the switch device 4 according to the second embodiment. The housing 50 is composed of two members including an upper housing 61 and a lower housing 62. The upper housing 61 has a cylindrical hollow protrusion 61a, and interconnects the inside of the housing 50 with the manipulation knob 51. A contact point pattern 62a is installed at the lower housing 62, and further four switches 52 shifting the contact point pattern 62a are mounted thereto. In addition, an input/output terminal portion 62b having an input terminal from the power source and an output terminal to the motor 2 is formed at the lower housing 62.

The manipulation knob 51 is a single member as described above and includes a rotating and sliding member 60. Even in FIG. 6, in the case where the rotating and sliding member 60 slides in the right direction, the manipulation is performed in the positive (+) direction, while, in the case where the rotating and sliding member 60 slides in the left direction, the manipulation is performed in the negative (+) direction.

The housing 50 includes a rotation driving unit 53 rotating by the rotation manipulation of the manipulation knob 51 and the above switch 52, a horizontal driving unit 54 capable of sliding together with the manipulation knob 51 with respect to the rotation driving unit 53, and a vertical driving unit 55 operated in the vertical direction by the horizontal driving unit 54. The manipulation knob 51 is engaged with a protrusion 54a formed on the horizontal driving unit 54, so that the horizontal driving unit 54 slides by the slide manipulation of the rotating and sliding member 60. Since a guide portion 53a guiding the horizontal driving unit 54 is formed at the horizontal rotation driving unit 53, an influence is not given to the operation of the rotation driving unit 53 even though the horizontal driving unit 54 is guided to slide. Meanwhile, when the rotating and sliding member 60 is manipulated to rotate, the rotation driving unit 53 rotates together with the horizontal driving unit 54.

The rotation driving unit 53 is composed of a single member and has the above horizontal guide portion 53a and an uneven portion 53b identical to that of the first embodiment. An attaching/detaching member 71 biased by a biasing member 70 between the rotation operating unit 53 and the upper housing 61 is attached to or detached from to the uneven portion 53b, accompanied by the rotation of the rotation driving unit 53, thereby providing a clicking feeling to the rotation manipulation. In addition, the biasing member 70 and the attaching/detaching member 71 are installed even in the horizontal guide portion 53a of the rotation driving unit 53, and the attaching/detaching member 71 makes attachment and detachment in the horizontal guide portion 53a accompanied by the sliding of the horizontal driving unit 54, thereby also providing a clicking feeling to the slide manipulation.

The vertical driving unit 55 for driving the switch 52 and the guide member 56 for guiding the vertical driving unit 55 are installed to the lower portion of the rotation driving unit 53. The vertical driving unit 55 includes four rocking levers 63 with a wing shape, and a driving body 64 moving vertically by the rocking levers 63. The rocking levers 63 have compressing protrusions 63a respectively at two locations. The compressing protrusion 63a has a center side installed on a slant surface, and this slant surface portion is compressed by the horizontal driving unit 54. Eight compressing protrusions 63a are formed in the entire circumferential direction, and at each rotating position of the manipulation knob 51, the compressing protrusions 63a are arranged so that any one of the compressing protrusions 63a is compressed by the horizontal driving unit 54 in accordance with the slide manipulation.

The rocking lever 63 is supported by the guide member 56 to be capable of rocking with a side of the center side as a pivotal center, and, if one of the rocking levers 63 is compressed by the horizontal driving unit 54 from the center side toward the outer circumferential side, the rocking lever 63 vertically rocks based on the side of the center side. By this operation, a corresponding one of the four driving bodies 64 is operated vertically. By doing so, one of the four switches 52 is shifted. The guide member 56 respectively includes four rocking supporting portions 56a for supporting the rocking lever 63 to be capable of rocking as described above, and four vertical guide portions 56b supporting the outer circumferential surface of the driving body 64 and allowing the driving body 64 to be vertically movable. By this configuration, the manipulation knob 51 operates one of the four switches 52 to be shifted even any one of the positive (+) and negative (−) directions of the rotating position and the slide manipulation.

The rotary shaft member 57 has a shaft portion 57a with an axial shape, and a connection portion 57c formed at the other end portion opposite to a shifting unit 57b formed at one end portion of the shaft portion 57a and connecting to a rotary shaft connection portion 53c of the rotation driving unit 53. By doing so, the rotary shaft member 57 may rotate together with the rotation driving unit 53.

Figure 7:
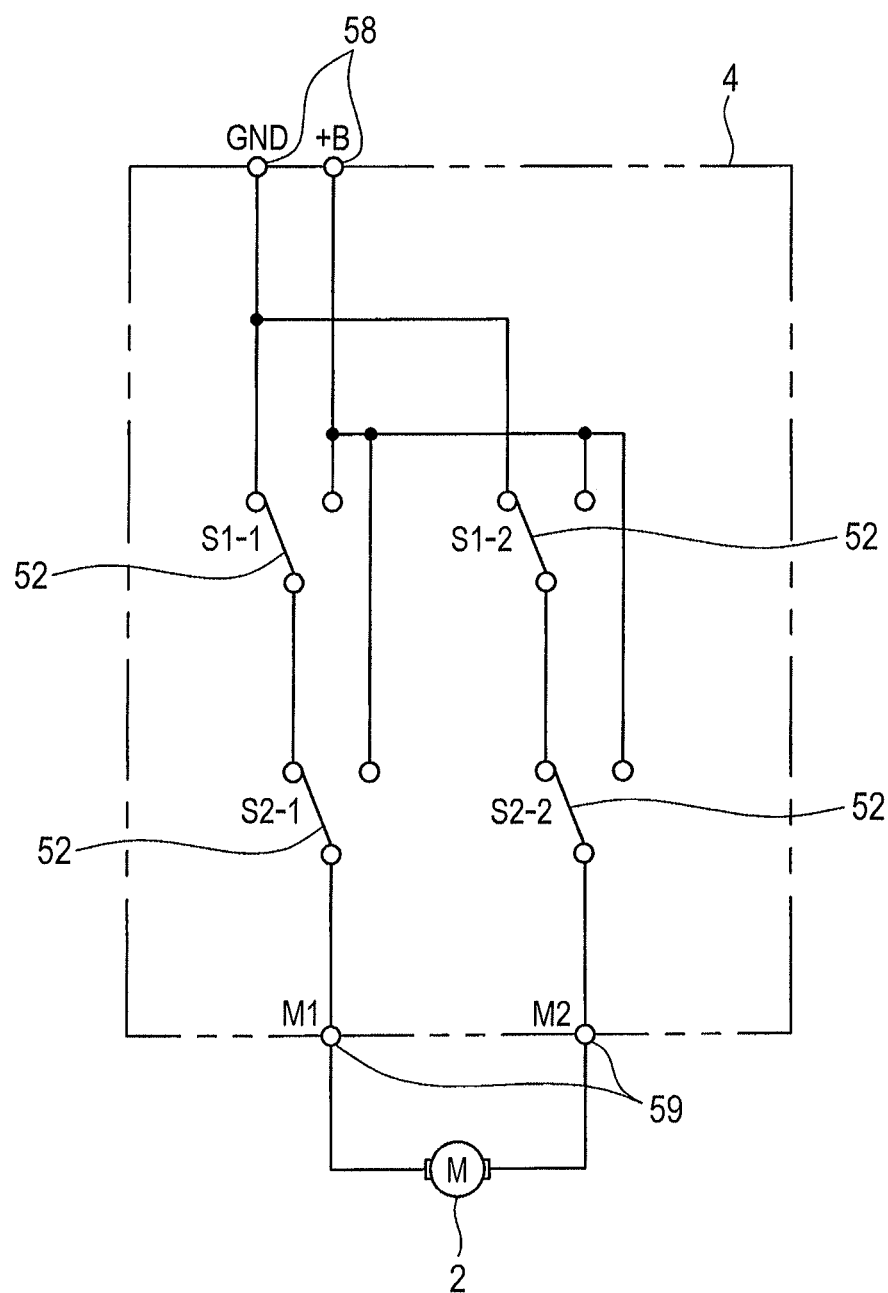
FIG. 7 is a circuit diagram showing the switch device according to the second embodiment.

The electric configuration of the switch device 4 will also be described. FIG. 7 is a circuit diagram showing the switch device 4 according to the second embodiment. Even in this embodiment, the input terminal 58 and the output terminal 59 make a pair. The input terminal 58 includes a ground terminal GND and a power terminal +B, and the output terminal 59 includes a first terminal M1 and a second terminal M2. The rotating direction of the motor 2 is defined to be identical to that of the first embodiment.

In this embodiment, since the switch 52 is manipulated only corresponding to the slide manipulation of the manipulation knob 51, four switches 52 (S1-1, S1-2, S2-1, and S2-2) have the same configuration. These switches 52 connect the first terminal M1 and the second terminal M2 of the output terminal 59 respectively to the ground terminal GND of the input terminal 58 in a status where manipulation is not performed.

The manipulation knob 51 is manipulated to slide, to shift the switches 52 as described above. When either one of the switches S1-1 and S2-1 is shifted, the first terminal M1 is connected to the power terminal +B, and the second terminal M2 remains connected to the ground terminal GND. Therefore, electric current flows from the first terminal M1 through the motor 2 to the second terminal M2, and the motor 2 rotates in the positive (+) direction. When either one of the switches S1-2 and S2-2 is shifted, the second terminal M2 is connected to the power terminal +B, and the first terminal M1 remains connected to the ground terminal GND. Therefore, electric current flows from the second terminal M2 through the motor 2 to the first terminal M1, and the motor 2 rotates in the negative (−) direction.

In addition, since the rotary shaft member 57 connects the motor 2 to the driving shaft corresponding to the shifting mechanism 3 according to the rotating position of the manipulation knob 51, the seat 1 is operated as desired according to the slide manipulation.

As described above, both rotation manipulation and slide manipulation are performed by the manipulation knob 51 composed of a single member, so that the switch 52 may be operated by the slide manipulation, not depending on rotating position of the manipulation knob 51. Therefore, there is no need of changing the manipulation knob 51 by the rotation manipulation and the slide manipulation, and a plurality of operations of the seat 1 may be manipulated in an easier and more reliable way.

In addition, even though three kinds of operations are introduced to the seat 1 in the second embodiment so that three kinds of operations may be shifted, since four switches 52 and four corresponding vertical driving units 55 are installed as shown in FIG. 6, four rotation manipulation positions of the manipulation knob 51 may be applied. Therefore, in the second embodiment, the shifting manipulation may be performed with the same configuration even in the case where one kind of operation, for example a tilting operation of the seat surface 1a, is additionally performed.

It should be understood by those skilled in the art that various modifications, combinations, sub-combinations and alterations may occur depending on design requirements and other factors insofar as they are within the scope of the appended claims of the equivalents thereof.

What is claimed is:

1. A switch device comprising:
a housing;
a switch disposed in the housing and shifting a pair of terminals of an input terminal and an output terminal in the housing;
a manipulation knob installed to the housing for shifting the switch; and
a rotary shaft member,
wherein the manipulation knob performs rotating manipulation at a plurality of rotating positions with respect to the housing and is capable of performing slide manipulation in both positive and negative directions at each of the plurality of rotating positions, so that the manipulation knob is interconnected with the rotary shaft member which rotates accompanied by the rotating manipulation, and
wherein the switch gives an output corresponding to each direction according to the manipulation in both the positive and negative directions even though the manipulation knob is at any one of the plurality of rotating positions, and the rotary shaft member has a shifting unit for driving an external shifting mechanism accompanied by the rotating,
wherein the manipulation knob includes a rotating member capable of rotating with respect to the housing, and a sliding member capable of rotating together with the rotating member and capable of sliding with respect to the rotating member,
wherein a rotation driving unit capable of rotating together with the rotating member and a horizontal driving unit capable of sliding with respect to the rotation driving unit together with the sliding member are installed at the housing, and the rotary shaft member is connected to the rotation driving unit, and
wherein the switch includes a slide-interlocking switch installed at the rotation driving unit shifted by the sliding of the horizontal driving unit and a rotation-interlocking switch shifted by the rotation of the rotation driving unit, the rotation-interlocking switch includes a movable contact point installed at the rotation driving unit and a fixed contact point installed at the housing and connects the slide-interlocking switch respectively to the input terminal and the output terminal at each of a plurality of rotating positions of the manipulation knob, and the slide-interlocking switch shifts a connection status between the input terminal and the output terminal in correspondence with the manipulation in both the positive and negative directions.

2. A switch device comprising:
a housing;
a switch disposed in the housing and shifting a pair of terminals of an input terminal and an output terminal in the housing;
a manipulation knob installed to the housing for shifting the switch; and
a rotary shaft member,
wherein the manipulation knob performs rotating manipulation at a plurality of rotating positions with respect to the housing and is capable of performing slide manipulation in both positive and negative directions at each of the plurality of rotating positions, so that the manipulation knob is interconnected with a rotary shaft member which rotates accompanied by the rotating manipulation, and
wherein the switch gives an output corresponding to each direction according to the manipulation in both the positive and negative directions even though the manipulation knob is at any one of the plurality of rotating positions, and the rotary shaft member has a shifting unit for driving an external shifting mechanism accompanied by the rotating,
wherein the manipulation knob includes a rotating and sliding member capable of rotating with respect to the housing and capable of sliding respectively at the plurality of rotating positions,
wherein a rotation driving unit capable of rotating together with the rotating and sliding member, a horizontal driving unit capable of sliding with respect to the rotation driving unit together with the rotating and sliding member, and a plurality of vertical driving units compressed in the vertical direction by the sliding of the horizontal driving unit at the plurality of rotating positions are installed at the housing, and the rotary shaft member is connected to the rotation driving unit, and
wherein the switch is installed at the housing to face the plurality of vertical driving units, and a connection status between the input terminal and the output terminal is shifted while the vertical driving unit is operated at each of the plurality of rotating positions of the manipulation knob.

* * * * *